3,390,747
DOUBLE-ACTING CENTRIFUGAL CLUTCH FOR WASHING MACHINE HAVING A SPIN-DRY ACTION
Günter Steinert, Lintorf, and Heinrich Vidahl, Dusseldorf, Germany, assignors to Constructa-Werke G.m.b.H., Munich, Germany, a corporation of Germany
Filed Oct. 21, 1966, Ser. No. 588,472
Claims priority, application Germany, Oct. 21, 1965, C 37,220
8 Claims. (Cl. 192—48.91)

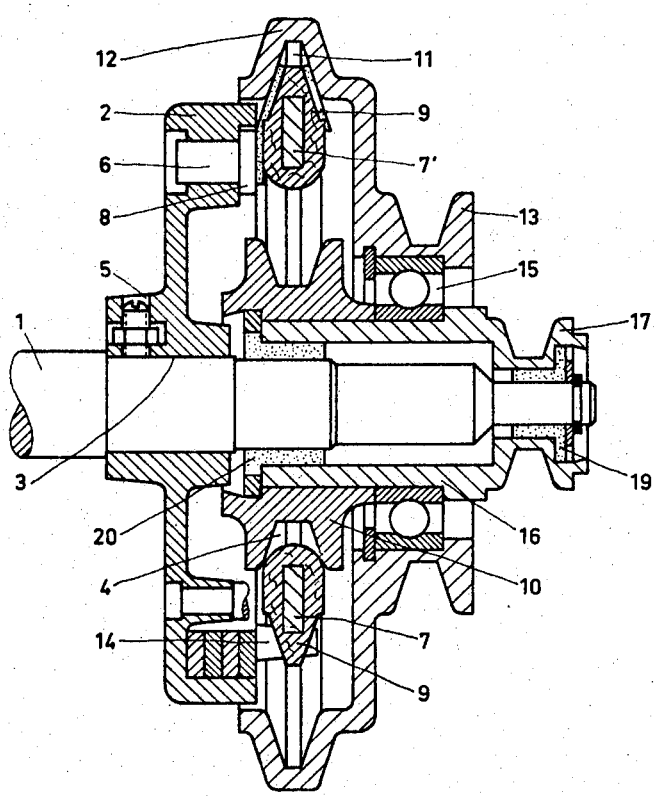

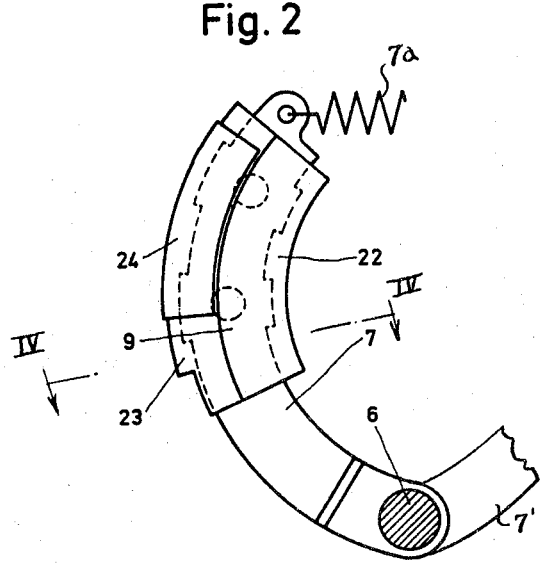
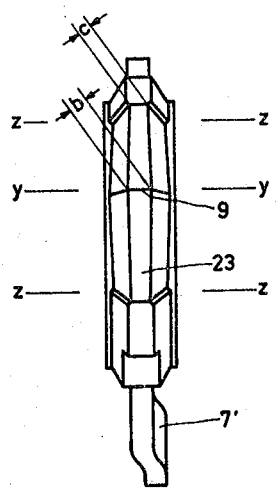
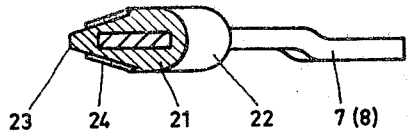

Our invention relates to double acting centrifugal clutch for a washing machine having a spin-dry action, and more particularly to such a clutch for a washing machine driven by a preferably pole-reversible electric motor and a double belt drive leading to the driving sheaves of the washer drum and connected with the centrifugal clutch.

A heretofore known double acting centrifugal clutch for a washing machine having a spin-dry action or motion is provided with two clutch wheels, an inner and an outer clutch wheel, the clutch surfaces thereof being in a common radially extending plane. A motor shaft is connected with a driving sheave swingly holding two double acting centrifugal levers. Depending upon the rotational speed of the motor shaft, the centrifugal levers, which are under spring tension, either engage with the inner or outer clutch wheels. The centrifugal levers have clutch cheeks that are wedge-shaped and that are received in correspondingly formed grooves in the clutch wheels.

During the wash operation or cycle, the washer drum is reversibly rotated and the centrifugal levers come into engagement with the clutch inner wheel so that the type of loading exerted on the centrifugal levers respectively, namely tensile or compressive loads, is dependent upon the rotary direction of the drive motor at that time. During the reversed wash operation, a good tight fit of the clutch cheeks of the centrifugal levers with the clutch wheel is of particular importance so that especially the respective tension-loaded centrifugal lever transmits the major portion of the load. During the spin-dry operation, the washer drum continuously rotates in one rotary direction. In the latter operating condition of the washer drum, the centrifugal levers are in engagement with the outer wheel of the clutch so that the same centrifugal lever is always subjected to a compressive force and the other lever to a tensile force.

Although a clutch of the foregoing type operates generally satisfactorily, it has been found that the engagement of the centrifugal levers with the clutch wheels when the drive motor is switched from washing speed to the higher spin-drying speed, took place roughly and suddenly. The rough and sudden engagement causes shock noises and a sudden increase in the speed of the goods being washed that are located in the rotating washer drum. Due to the great initial acceleration at start-up of the spin-dry cycle, the goods being washed are rubbed against the inner peripheral surface of the washer drum so that damage thereto cannot be completely avoided. A further disadvantage of the heretofore known clutching device is that during start-up of the spin-dry cycle, the drive motor must be given a large turning moment so as to accelerate the washer drum which is loaded with wash goods.

It is accordingly an object of our invention to improve the centrifugal clutch of a washing machine which has a spin-dry cycle so that the aforementioned disadvantages thereof are avoided.

It is a further object of our invention to provide an improved centrifugal clutch of the aforementioned type which will reduce the noise of operation thereof.

It is another object of our invention to provide such a centrifugal clutch as will reduce the acceleration of the washer drum when operation thereof is switched to spin-dry.

It is also an object of our invention to provide a centrifugal clutch of the foregoing type which will afford less danger of damage to the good being washed.

It is an additional object of our invention to provide such a centrifugal clutch as will reduce the torque applied to the washer drum.

It is yet another object of our invention to provide such a centrifugal clutch as will permit the use of a considerably smaller drive motor than normally required for a particular washing machine.

With the foregoing and other objects in view, we provide in accordance with our invention an improved centrifugal clutch for a washing machine having a spin-dry cycle, which comprises a pair of centrifugal levers, one of the centrifugal levers, i.e., the lever stressed in tension, being in engagement with the clutch wheel that transmits the spin-drying speed to the drive wheel of the washer drum at the transition from the washing speed to the spin-drying speed and during the spin-drying operation, whereas the other centrifugal lever is prevented by a stop from engaging with the last-mentioned clutch wheel. During the washing cycle, however, both double acting centrifugal levers are in engagement with the clutch inner wheel to effect the lower washing speed.

The double acting centrifugal lever that is tension-loaded during the spin-dry cycle is provided with two clutch linings having material of different characteristics, the clutch lining which faces and engages the clutch wheel during the spin-dry cycle having a lower coefficient of friction than the clutch lining facing and engaging the clutch wheel during the wash cycle.

Both of the foregoing inventive features serve the same purpose, namely to avoid or minimize the shock caused when the clutch is engaged and also to effect a so-called "soft" start-up of the washer drum to the spin-dry operation. Due to the fact that only the tension-loaded double acting centrifugal lever comes into engagement with the clutch wheel which produces the spin-dry operation during the transition from the washing speed to the spin-dry speed, a particularly smooth and soft engagement is achieved. It has been found that the other compression-loaded centrifugal lever is wedged fast when in clutch engagement within the groove of the clutch wheel effecting the spin-dry drive. The tension-loaded centrifugal lever on the other hand is in relatively loose engagement with the clutch wheel effecting the spin-dry operations so that a distinct slip occurs which permits smooth and gentle high-speed rotation of the washer drum during spin-dry operation. Due to the fact that the centrifugal lever friction lining facing and engaging the outer wheel of the clutch has a smaller coefficient of friction than the second lining, the slip which occurs during the engagement of the clutch shoe of the centrifugal lever against the clutch surface of the outer wheel serves to additionally increase the slip effected by the tension-loaded centrifugal lever.

According to a further feature of our invention, the clutch shoe of the centrifugal lever facing the grooves of the outer wheel of the clutch has a different cross-sectional shape than the shoe facing the inner wheel, in that either the width or the thickness of the cross-section of the outer clutch shoe or both the width and thickness thereof are greater in the middle zone than at both end zones of the clutch shoe. By means of this novel construction, a smoother clutch engagement producing slippage of the clutch is effected. At the transition from washing to spin-drying, a relatively small surface of the clutch lining of the tension-loaded centrifugal lever is first brought into engagement with the clutch wheel. The arresting effect of this small clutch surface is insufficient for transmitting the drive moment abruptly to the outer wheel of the clutch, so that the washer drum is accelerated only gradually to the spin-dry speed.

Other features which are considered as characteristic for the invention are set forth in the appended claims.

Although the invention as illustrated and described herein as embodied in double acting centrifugal clutch for washing machine having a spin-dry cycle, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof will be best understood from the following description of a specific embodiment when read in connection with the accompanying drawings, in which:

FIG. 1 is a longitudinal sectional view of a double acting centrifugal clutch constructed in accordance with our invention;

FIG. 2 is a plan view of the centrifugal lever of FIG. 1 which is tension-loaded during the spin-dry cycle;

FIG. 3 is a diagrammatic side view of the upper portion of the centrifugal lever as shown in FIG. 2 with the clutch lining removed; and FIG. 4 is a cross-sectional view of FIG. 2 taken along the line IV—IV in the direction of the arrows.

Referring now to the drawings and first particularly to FIG. 1 thereof, there is shown a motor shaft 1 of a non-illustrated pole-reversing or reversible drive motor for a washing machine having a spin-dry cycle to which a drive plate or disc 2 is secured. The motor shaft 1 has a surface 3 which serves as a seat for the drive plate 2 secured thereto by a set screw 5. The drive plate 2 is provided with a pivot pin 6 on which the arms 8 of a pair of substantially similar double acting centrifugal levers 7, 7' (also see FIGS. 2 to 4) are articulatingly mounted. The centrifugal levers 7, 7' swing outwardly away from one another in a radially extending plane when the clutch is in operation. During the wash cycle of the washing machine, both of the centrifugal levers 7, 7' pass against the sides of the groove 4 of the inner wheel 10 of the clutch with their clutch shoes 9, whereas only the clutch shoe of the tension-loaded centrifugal lever 7' engages in the groove 11 of the outer wheel 12 of the clutch during the spin-dry cycle. On the other hand, during the spin-dry cycle, the other centrifugal lever 7 is prevented from engaging the outer wheel of the clutch by a stop 14 in the form of a wedge-shaped projection or key attached to the drive plate or disc 2. The centrifugal levers are either connected together with a tension spring 7a (FIG. 2) at the ends thereof which are opposite to the mounting pin 6 or are connected to separate tension springs which are also fastened to the clutch frame, for example (not shown). The tension springs and the masses of the centrifugal levers are of such size that the centrifugal levers are released from the groove 4 of the inner clutch wheel when the rotation of the washer drum is increased above the operating speed thereof during the wash cycle, so that the one centrifugal lever 7 swings against the stop 14 and the centrifugal lever 7' engages in the groove 11.

As is apparent, a V-belt sheave 13 which imparts the spin-dry drive to the washer drum is formed in one piece with the outer wheel 12 of the clutch and is mounted so that it is loosely rotatable on the hollow shaft 16 of the V-belt sheave 17 with a ball bearing 15 located therebetween. The hollow shaft 16 also carries the inner wheel 10 of the clutch and is securely fastened thereto by any suitable means such as welding or the like. The V-belt sheave 17 is also mounted loosely and rotatably on the motor shaft 1 with sintered slide bearings 19, 20 located therebetween. Such bearings are well known in the trade and may be of any suitable composition.

As shown more clearly in FIGS. 2 to 4, both centrifugal levers 7 and 7' (only lever 7 is fully shown in FIG. 2, however, lever 7' is of course substantially of the same construction) are provided with an abrasion-resistant clutch lining 22 formed as a clutch shoe (FIG. 4). Thus, the radially inner clutch surface of lining 22 of the clutch shoe, which has an arcuate bend in cross-section, comes into engagement with the inner wheel of the clutch (see the lower part of FIG. 1), whereas the other substantially roof-shaped and pointed, radially outer clutch surface 23 comes into engagement with the outer wheel of the clutch only during the period that the tension-loaded centrifugal lever 7' is subjected to the spin-dry operation (see the upper part of FIG. 1). As shown particularly in FIG. 4, the clutch shoe is provided with an additional clutch lining 24 at the radially outer margin thereof which has a greater coefficient of friction than the radially inner clutch lining surface 22. The material of the lining 24 is of high resistance to friction similar to that of automobile clutches whereas the material of lining 22 may be somewhat softer. Any suitable lining materials from the great number generally available may be used as long as they meet the aforestated requirements. The clutch lining 24 is secured to the clutch shoe by a suitable cement bond. It is especially apparent from FIG. 3, that the clutch lining 24 has a middle zone $y$—$y$ of width $b$ which is greater than the width $c$ of the both end zones $z$—$z$ thereof so that a varying cross-sectional outline is produced. When the centrifugal lever 7' swings toward the clutch outer wheel 12, the surface region of the zone $y$—$y$ initially comes into contact with the sides of the groove 11 (FIG. 1). Due to the relatively small coefficient of friction between the clutch shoe 9 and the material of the outer wheel of the clutch as well as the composition of the surface of the groove 11, the small surface of the clutch lining 24 coming at first in frictional contact with the groove of the clutch outer wheel is unable to transmit the drive moment to the outer wheel of the clutch so that distinct slippage occurs and the washer drum is accelerated slowly until it reaches the spin-dry rotary speed. It is of course also understood that it is within the scope of our invention to provide the clutch shoe with other shapes than that indicated in the drawing. However, the cross-sectional profile of the clutch shoe must be such that the middle zone $y$—$y$ differs from the end zone $z$—$z$ so as to prevent the entire surface of the clutch shoe or the largest portion of the surface thereof from coming into engagement suddenly with the clutch wheel of the centrifugal clutch that provides the spin-dry drive.

The centrifugal clutch constructed in accordance with our invention renders it possible to drive the washing machine having a spin-dry cycle with a drive motor requiring almost 40% less power than used for similarly constructed washing machines so that in addition to the advantage of the essentially smoother operation of the washing machine when the spin-dry cycle is commenced, a noiseless clutch engagement is also effected.

We claim:
1. Double-acting centrifugal clutch for a washing machine having a drip-dry cycle, comprising outer and inner clutch wheels coaxial to one another, said outer wheel having an inner peripheral clutch-engaging surface and said inner wheel having an outer peripheral clutch-engaging surface, both of said peripheral surfaces being disposed in a common radial plane, rotary drive means coaxially aligned with and adjacent said outer and inner clutch wheels, a pair of centrifugal levers pivotally mounted on said rotary drive means in the space between said outer and inner clutch wheels, said levers being selectively pivotable outwardly and inwardly into clutching engagement with said outer and inner clutch wheels, respectively, in dependence on the rotary speed of said drive means, one of said levers being tension-loaded and the other being compression-loaded during rotation of said drive means, and stop means located on said rotary drive means between said compression-loaded lever and said outer clutch wheel, whereby said tension-loaded lever is pivotable into clutching engagement with said outer clutch wheel during transition from wash speed to drip-dry speed of the washing machine and during the drip-dry cycle thereof, while said compression-loaded lever is prevented by said stop means from coming into clutching engagement with said outer clutch wheel and, during the wash cycle of the washing machine, both of said levers are pivotable into engagement with said inner clutch wheel.

2. Double-acting centrifugal clutch according to claim 1 wherein said tension-loaded centrifugal lever has a coupling shoe with two clutch linings of material having different coefficients of friction on the sides thereof facing said outer clutch wheel and said inner clutch wheel, respectively, said lining facing said outer clutch wheel having a coefficient of friction greater than said lining facing said inner clutch wheel.

3. Double-acting centrifugal clutch according to claim 2, wherein said clutch engaging surfaces of said inner and outer clutch wheels define annular grooves formed respectively on the inner periphery of said outer wheel and on the outer periphery of said inner wheel, said coupling shoe being engageable selectively in said annular grooves, and having a varying cross section, the cross section at a middle zone thereof being greater than the cross section at both end zones thereof.

4. Double-acting centrifugal clutch according to claim 3 wherein the width of the cross section at said middle zone is greater than the width of the cross section at said end zones.

5. Double-acting centrifugal clutch according to claim 3 wherein the height of the cross section at said middle zone is greater than the height of the cross section at said end zones.

6. Double-acting centrifugal clutch according to claim 3 wherein the width and height of the cross section at said middle zone are greater than the width and height, respectively, of the cross section at said end zones.

7. Double-acting centrifugal clutch according to claim 1 wherein said drive means comprises a driving plate mounted on a drive motor shaft located on one side of the clutch, said centrifugal levers being pivotally mounted on said driving plate, said outer clutch wheel being integral with a first belt sheave adapted to provide spin-dry operation and said inner clutch wheel being secured on a hollow shaft connected to a second belt sheave adapted to provide wash operation, both of said sheaves being located on the other side of the clutch from said driving plate, said first belt sheave being rotatably mounted on said second belt sheave and said hollow shaft of said second belt sheave being rotatably mounted on said drive motor shaft with slide bearings.

8. Double-acting centrifugal clutch according to claim 1 wherein both of said centrifugal levers have clutch linings of differing coefficients of friction.

References Cited
UNITED STATES PATENTS

| | | | |
|---|---|---|---|
| 2,275,046 | 3/1942 | Harris | 192—103 |
| 2,639,794 | 5/1953 | McNairy | 192—105 |

BENJAMIN W. WYCHE III, *Primary Examiner.*